US006355992B1

(12) United States Patent
Via

(10) Patent No.: US 6,355,992 B1
(45) Date of Patent: Mar. 12, 2002

(54) HIGH VOLTAGE PULSE GENERATOR

(75) Inventor: Lester C. Via, Springfield, VA (US)

(73) Assignee: Utron Inc., Manassas, VA (US)

( * ) Notice: Subject to any disclaimer, the term of this patent is extended or adjusted under 35 U.S.C. 154(b) by 0 days.

(21) Appl. No.: 09/372,109

(22) Filed: Aug. 11, 1999

Related U.S. Application Data

(60) Provisional application No. 60/096,157, filed on Aug. 11, 1998.

(51) Int. Cl.[7] .................................................. H02M 5/10

(52) U.S. Cl. ........................ 307/419; 307/108; 307/109; 307/106

(58) Field of Search ................................ 307/419, 106, 307/108, 109; 361/330; 327/182

(56) References Cited

U.S. PATENT DOCUMENTS 3,513,327 A 5/1970 Johnson
3,602,906 A * 8/1971 Wiegand ............. 340/174 TW
4,442,362 A 4/1984 Rao
4,484,085 A * 11/1984 Fallier et al. ............... 307/106
4,547,679 A 10/1985 Hansen et al.
5,006,726 A 4/1991 Okumura
5,274,271 A 12/1993 McEwan
5,311,067 A 5/1994 Grothaus et al.
5,650,670 A * 7/1997 Thaxter ...................... 307/106
5,798,579 A 8/1998 McPhee
5,900,681 A 5/1999 Johansson et al.

* cited by examiner

*Primary Examiner*—Josie Ballato
*Assistant Examiner*—Robert L. Deberadinis
(74) *Attorney, Agent, or Firm*—James Creighton Wray; Meera P. Narasimhan

(57) ABSTRACT

A high voltage pulse generator provides a short, fast rise, high voltage pulse from a very low impedance suitable for initiating high energy electrical discharges in liquids and high pressure gases. Its low impedance allows extremely high currents from external energy storage capacitors to be conducted through the invention once the invention has initiated an arc. Its fast rise time is suitable for initiating multiple arcs or even sheet surface discharges in high pressure gasses under suitable conditions.

35 Claims, 2 Drawing Sheets

HIGH VOLTAGE PULSE GENERATOR

This application claims benefit of U.S. Provisional application No. 60/096,157 filed Aug. 11, 1998.

This invention was made with Government support under Contract DASG60-97-C-0003 awarded by the Ballistic Missile Defense Organization. The Government has certain rights in this invention.

BACKGROUND OF INVENTION

This invention relates in general to a novel low impedance generator of short, fast rise, high voltage pulses. More specifically , the invention relates to a means of initiating an electrical arc in high pressure gasses and subsequently permitting the conduction of an extremely high electric current from an external, high energy, lower voltage source after the discharge arc has been established.

The use of a short high voltage pulse to trigger the discharge of electrical energy stored in capacitors is generally known in the art. However, a separate trigger electrode is required in devices such as electronic flash tubes, ignitrons, and high voltage spark gap switches. Such devices can also be triggered by momentarily placing a high voltage across those electrodes intended to conduct the primary discharge. This method of triggering discharges is not generally done because the trigger device would impede the heavy current flow of the primary discharge path.

A high voltage trigger pulse generator placed in series with the primary stored energy discharge path, however, would have to be capable of conducting the peak primary discharge current without adding a significant impedance. This requirement generally prohibits the use of a series trigger device. The discharge current of even the small electronic flash in a camera typically exceeds a hundred amperes while the primary discharge currents of some very high energy devices can exceed a million amperes. The inductance of the typical high voltage trigger transformer winding placed in series with the primary discharge path would severely limit the pulse current.

A reduced secondary inductance also reduces the leakage inductance as it appears in the secondary. The reduced secondary leakage inductance will decrease the rise time of the high voltage output pulse. This is yet another reason for designing a transformer with minimal inductance.

If a high voltage trigger transformer is designed for minimal secondary winding inductance, the low inductance of the primary winding then becomes a problem. The generation of a high voltage pulse with a transformer requires a high turns ratio. Typically, energy is stored at a relatively low voltage in a capacitor which is then dumped into the primary of the trigger transformer using a suitable switching device. If the inductance of the capacitor, switch, and connecting leads is significant compared to leakage inductance of the trigger transformer's primary winding there will be a significant drop in the peak voltage appearing across primary winding. Reducing the secondary winding's inductance to a tolerable value will often result in an intolerably low leakage inductance appearing in the primary.

The ultimate low inductance pulse transformer will have but a single turn on an air core as the primary. This single turn would be in the form of a cylindrical sheet conductor with the secondary wound directly over or directly under the sheet single turn. The primary winding leakage inductance of such an arrangement can be extremely low. This inductance can be estimated by counting the number of square flux tubes that are enclosed in the space between the primary and secondary windings. Each square flux tube can be considered to represent an inductance of 1.26 uH per meter of length. The flux tubes represent inductances in parallel so the total is the inductance of a single flux tube divided by the total number of parallel flux tubes. A 6 inch diameter, 12 inch long cylindrical sheet primary, spaced 0.25 inches from the secondary, for example, would have a leakage inductance of approximately 0.013 uH. It would be difficult to hold the stray primary circuit inductances to a value insignificant compared to 0.013 uH. In reality, the stray circuit inductances would probably be several times that of the transformer primary allowing only a small fraction of the capacitor voltage to appear across the transformer input.

A means of overcoming the problems associated with a series triggering device just described, however, could be used with high pressure capillary discharge devices where tensile strength requirements preclude the use of electrical insulators as the supporting walls of a pressure vessel. A trigger electrode is generally placed in the center of a capillary discharge device such as an electronic flash. A high pressure capillary device, however, can require trigger voltages that exceed 50,000 volts and generate pressures above 10,000 psi. The insulation required around the conductor used to make the connection to the trigger electrode through the capillary wall would unacceptably weaken the capillary structure.

SUMMARY OF THE INVENTION

It is therefore an object of this invention to provide a new and novel means of generating high voltage pulses from an extremely low impedance source allowing high currents to be delivered to low impedance loads.

It is a further object of the invention to provide a high voltage pulse source with the capability of conducting an extremely high current from an external source into a common load.

It is a further object of the invention to provide a means of initiating high current plasma discharges in liquids and high pressure gasses.

It is a further object of the invention to provide high voltage, high current pulses with very short rise times.

It is a further object of the invention to provide high voltage, low impedance, fast rise pulses suitable for initiating arc discharges in liquids and high pressure gasses and multiple arc or sheet surface discharges on a dielectric material in high pressure gasses.

Briefly, the foregoing and additional objects are accomplished by a device consisting of an energy storage capacitor formed by thin stack of two or more conductive plates that also serve as the single turn primary winding of a pulse transformer. Each plate is separated from the adjacent plate by a layer of dielectric material. Alternate conductive plates protrude from the dielectric sheets on opposing edges of the stack allowing the plates to be interconnected so as to form a single capacitor with the terminals on opposite edges of the stack. The stack is formed around a cylinder with the capacitor terminals close together but held sufficiently distant from each other so as to provide a gap with the desired dielectric breakdown strength. If this capacitor, when charged, is suddenly discharged by short circuiting the gap, the discharge current path is the equivalent of a single turn sheet cylindrical coil that can be used as the primary of a pulse transformer. The addition of a secondary winding placed inside or wound around the outside of the hollow cylindrical capacitor will provide the high voltage output. This arrangement totally eliminates any stray inductances due to the interconnects between a separate energy storage capacitor and transformer primary winding.

The foregoing and additional objects, features, and advantages of the present invention will be apparent to those skilled in the art from the following detailed description of a preferred embodiment, taken with the accompanying claims and the drawings.

DESCRIPTION OF THE PREFERRED EMBODIMENT

Figure 1:
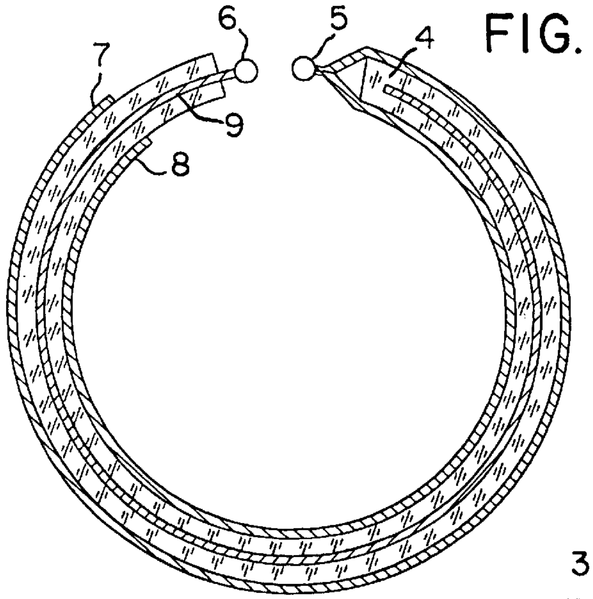
FIG. 1 is a simplified cross sectional view of the invention.

Turning now to a more detailed consideration of the invention, reference is now made to FIG. 1, which is a simplified cross sectional view of a cylindrical structure intended to illustrate the concept of using two or more conductive plates 7, 8 and 9 to form both a capacitor and a single turn inductor. Each plate is insulated from the adjacent plates with a suitable dielectric material 4. The plates are electrically connected to a pair of terminals 5 and 6 with each plate connected to the opposite terminal as is its adjacent plate. This arrangement results in a fixed capacitance appearing between the terminals 5 and 6 which can be easily calculated, by those skilled in the art, knowing the area of the plates and the dielectric constant and thickness of the dielectric material.

If the capacitance is charged by momentarily connecting the terminals to a voltage source, then abruptly discharged by momentarily short circuiting the terminals, the discharge current flowing in the plates will form a single turn sheet current loop. This current will rapidly increase at a rate determined by the initial charge voltage and the inductance of the sheet current loop.

A simple method of providing the momentary short circuit is to charge the capacitance until the air in the gap between terminals 5 and 6 breaks down resulting in an arc. The breakdown process is very fast and the inductance of the sheet current loop is very low resulting in an extremely high rate of magnetic flux change within the boundary of the sheet current loop. One or more turns of another conductor sharing this magnetic flux will have a voltage induced in it. Voltages exceeding ten kilovolts per turn are easily obtainable, thus providing the means of generating short, fast rise, high voltage pulses from a very low impedance.

While the inductance of the sheet current loop is a function of the circumference and length of the sheet current loop, it is also a function of the geometry of the short circuit. Terminals 5 and 6 can be the full length of the cylindrical structure along the edge of the conductive plates. A short circuit applied simultaneously along the entire edge will result in a lower inductance than a short circuit applied at opposing points somewhere along the edge.

The inductance of the sheet current loop, while difficult to calculate, when current distributions are not uniform, is easy to measure. The inductance and capacitance of the plates form a resonant circuit and the sudden discharge will result in a damped sinusoidal current waveform. Since the capacitance is easily determined by measurement or calculation, the inductance can be determined indirectly by measuring the frequency of the discharge waveform. The frequency can be measured using an oscilloscope to display the voltage waveform induced in a small loop of wire placed near or within the sheet current loop.

It also should be pointed out that the discharge current sheet is uniform around the circumference of the device when the entire length of the gap is shorted. Each capacitor plate will have a maximum current density at the end which is connected to a terminal. The current density will begin decreasing linearly at the point it encounters an adjacent plate connected to the opposite terminal, decreasing to zero at its far end. Since the current gradient is in opposite directions in adjacent plates the net result is that the total current is uniform around the circumference of the device.

Figure 2:
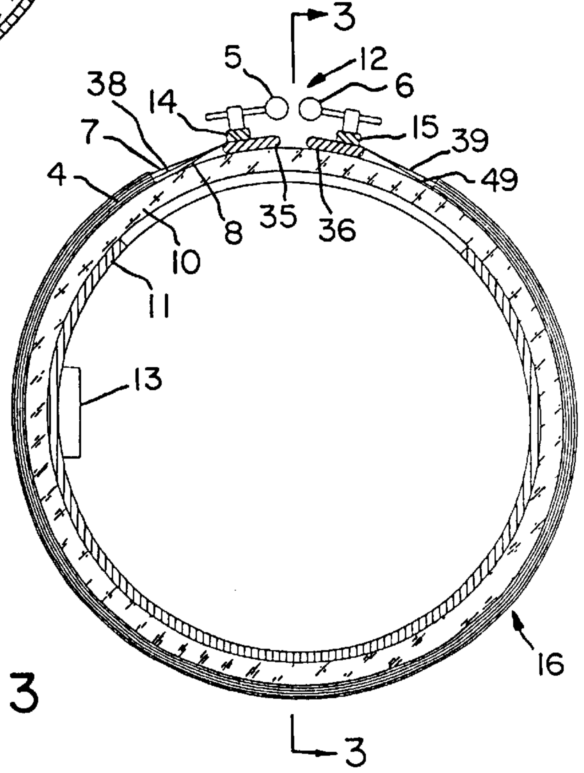
FIG. 2 is detailed cross sectional view of a preferred embodiment of the simplified cross sectional view shown in FIG. 1.
Figure 3:
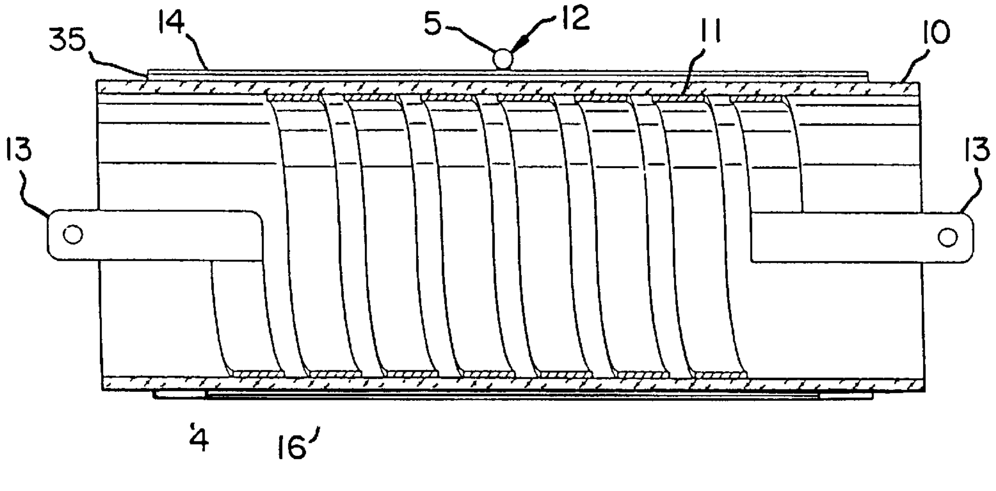
FIG. 3 is a sectional view of the device taken along line 3—3 of FIG. 2.

FIGS. 2 and 3 illustrate the structural features of a preferred embodiment of the high voltage pulse generator. The main supporting element is a dielectric tube 10 upon which capacitor/coil stack 16, comprised of alternate layers of conducting foil 7, 8, and 38, and the dielectric material 4, are located. The dielectric tube also serves as a support for a helical secondary winding 11 and an insulating barrier between the primary capacitor/coil stack 16. A terminal 13 at each end of the helical secondary winding provides a means of making electrical connection to the high voltage output. Typically an odd number of conducting foil layers is used so that both the outer 7 and inner 8 foil layers are connected to the same terminal 5 placing both the inner and outer foils at the same potential. This is useful in certain applications where terminal 5 can be at ground potential. In other applications, however, it would make no difference whether an odd or even number of foil layers are used. Any number of intermediate layers 38, 39 and 49 can be used to obtain the desired total capacitance.

Figure 4:
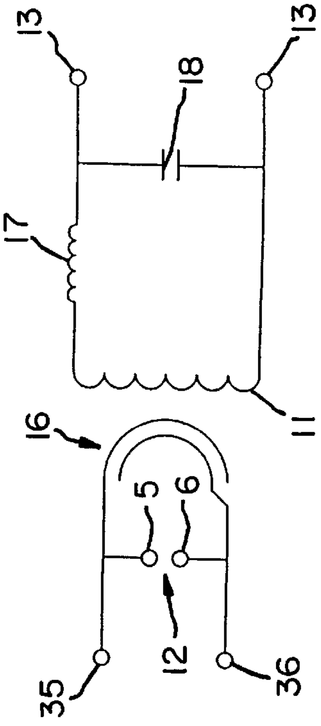
FIG. 4 is a schematic representation of the present invention.

The layers of foil are secured to the terminals by sandwiching them between a terminal clamping device 14 and 15 and the terminal bases 35 and 36. An adjustable spark gap 12 is used to control the voltage at which the discharge occurs. This preferred embodiment uses the simple spark gap illustrated, because adequate performance for the intended application was obtained by this means. The output impedance can be further lowered and the output rise time further shortened by using the terminals 35 and 36 as a rail gap switch and triggering the discharge with a third trigger electrode as is done in a rail gap switch. This invention, with the simple spark gap shown in this preferred embodiment, would be an ideal device to trigger a rail gap switch used in a much larger version of the invention. In FIGS. 3 and 4 terminals 5 and 6 may be rods extending along the tube 10.

FIG. 4 is a diagrammatic representation of the preferred embodiment illustrated in FIG. 2 and FIG. 3. The switching device is depicted as the simple spark gap 12 used in the preferred embodiment while the foil and dielectric stack 16 is depicted as two closely spaced but electrically isolated semicircles representing the single turn sheet loop that serves as the primary of a transformer. Terminals 35 and 36 receive the input power. The transformer's secondary winding 11 is shown connected to an inductor 17 and a capacitor 18 as well as the secondary terminals 13. The inductor 17 represents the transformer's leakage inductance as it appears to the secondary while the capacitor 18 represents the effective secondary winding capacitance. It is important to determine the values of these stray reactances when designing any embodiment of the invention because of their influence on the invention's performance characteristics. The rise time characteristics of the output pulse is a function of the value of these stray components. Additionally, there is an optimum total secondary capacitance that results in the maximum transfer of energy between the primary and secondary.

Figure 5:
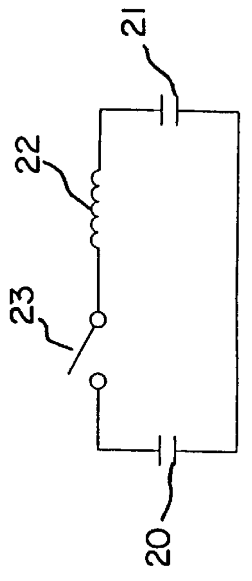
FIG. 5 is a schematic representation of a simple circuit used to aid in the explanation of the invention's operating principles.

FIG. 5 depicts a simple circuit that can be used to illustrate the transfer of energy between two capacitors 20 and 21 connected through an inductor 22 and a switch 23. If capacitor 20 is initially charged to some voltage and capacitor 21 is completely discharged, the closing of the switch 23 will cause the charge on the initially charged capacitor 20 to begin to charge the initially discharged capacitor 21. The current through the inductor 22 will continue to increase until the voltage on the two capacitors is equal and the current reaches a maximum. Subsequently, the energy stored in the inductor will cause the current to continue flowing until the inductive energy decreases to zero. If the switch is opened at the instant the current reaches zero the energy represented by the initial charge will now be distributed between the two capacitors in a manner determined by their relative values. If the capacitors are of equal value all of the energy will now appear in the initially discharged capacitor 21 while the initially charged capacitor 20 will be completely discharged. If, however, the initially discharged capacitor 21 is smaller than the initially charged capacitor 20, the initially charged capacitor 20 will not completely discharge before the current flow stops. Conversely, if the initially discharged capacitor 21 is larger than the initially charged capacitor 20, the current flow will not stop when the initially charged capacitor 20 has completely discharged but will begin charging this capacitor in the opposite polarity until the current flow stops. This happens because at the instant the energy in the initially charged capacitor 20 is zero there is energy stored in the inductor 22 which is subsequently added to both capacitors. The reverse charge represents energy in the initially charged capacitor 20 that could not be transferred to the originally discharged capacitor 21. Only in the case where the capacitors are of equal value will all of the initial energy be transferred to the opposite capacitor.

In the disclosed invention, however, the energy transfer occurs across a transformer. Energy initially stored in the capacitor/coil stack 16 is transferred to the stray secondary capacitance 18 and to any load connected to the secondary terminals 13. In this case the effective turns ratio between the primary and secondary must be considered. The value of the stray secondary capacitance is transformed by the square of the effective turns ratio into a larger capacitance. If, for example, the effective turns ratio is ten, then the stray secondary capacitance and any additional capacitance in an external load would appear to be one hundred times greater than it is.

It is important to consider these capacitances in the design of any embodiment since the capacitance of the primary capacitor/coil stack would generally be matched to the apparent value of the secondary capacitance considering the effective turns ratio of the transformer. The effective turns ratio is not precisely equal to the physical turns ratio since a significant portion of the total magnetic flux is leakage flux - flux not shared by both windings. The effective turns ratio will always be somewhat less than the physical turns ratio because the primary and secondary cannot occupy the same space.

The determination of the effective stray secondary capacitance is not as straightforward as it may first appear. Most of this capacitance is due to the capacitance between the secondary winding and the primary capacitor/coil stack. This capacitance must be charged when a voltage is induced in the secondary winding but this capacitance is distributed along the secondary winding in a way that charges each point to a different voltage. Consequently, each point along the secondary winding appears to have a different turns ratio relating it to the primary. The effective capacitance is not the same as the value measured between the secondary winding and the capacitor/coil stack but it can be approximately determined from that value. If it is assumed that both the winding capacitance and voltage generated along the helical secondary winding are a linear function of distance along the helix, the energy stored can be related to the energy stored if the entire helix were at the potential existing at the end of the helix. Energy stored in a capacitor is a function of the square of the voltage. If the length of the conductor forming the helix is considered unity, and x represents a position along the conductor length the energy stored in a small increment dx relative to the energy existing in dx when x=1 is:

$$\text{Relative Energy}_{dx} = x^2 dx$$

and the total energy stored in the helix capacitance relative to the energy stored if all of the helix were at the same potential is:

$$\text{Relative Energy} = \int_0^1 x^2 dx$$

and, $$\int x^2 dx = \frac{x^3}{3}$$

therefore:

$$\text{Relative Energy} = \frac{1^3}{3} - \frac{0^3}{3} = \frac{1}{3}$$

The energy stored in the capacitance between the helical secondary and the capacitor/coil stack is one third the energy that would exist if the entire helical secondary winding were at its output potential. The distributed capacitance can therefore be represented by a capacitance at the output of the secondary that is one third the value measured between the helical secondary winding and the capacitor/coil stack. However, this only applies to situations where one end of the secondary winding is grounded or held at some fixed potential which will usually be the case.

Once the capacitor/coil stack has discharged its energy and the spark gap's arc has extinguished, the helical secondary winding will behave as a simple inductor with an inductance equal to that calculated for the helical secondary alone. A typical application for the invention is to trigger the discharge of high energy storage capacitor banks into a plasma that has been formed by the high voltage trigger pulse in a gas or liquid. These energy storage banks typically use a pulse forming network to a shape high energy discharge waveforms. The helical secondary winding can be designed to provide the inductance requirements of a component in the pulse forming network thus serving two purposes - triggering the discharge and shaping the high energy pulse.

Figure 6:
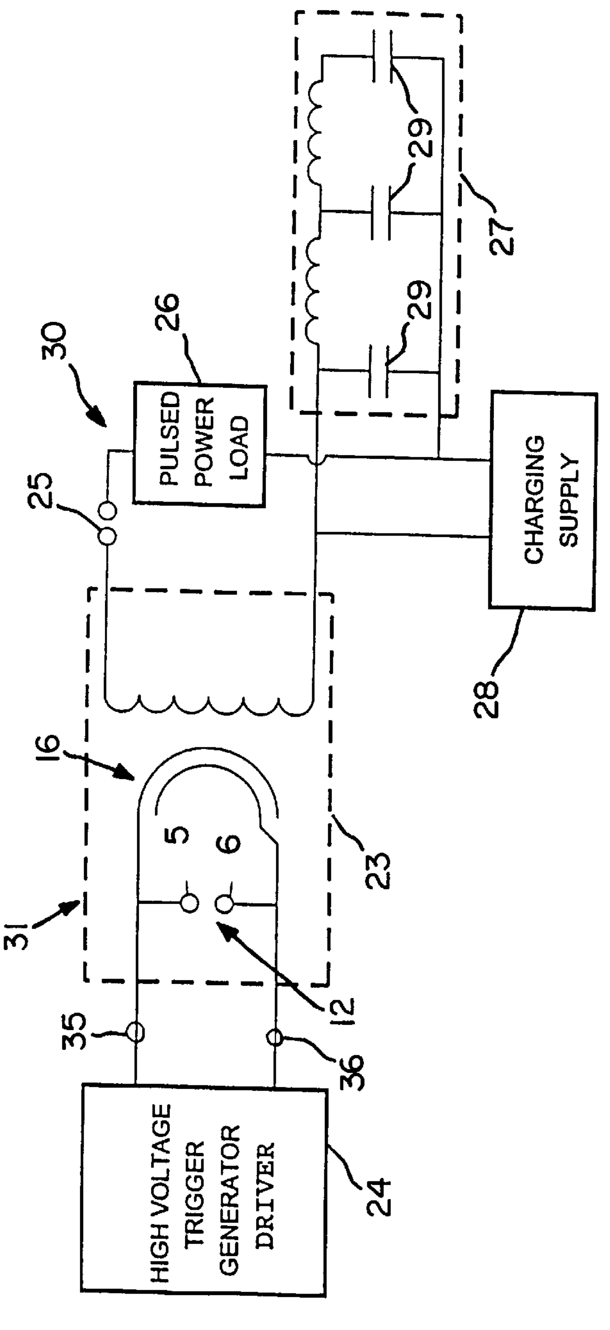
FIG. 6 is a schematic representation of a typical application of the present invention.

FIG. 6 shows a diagrammatic representation of the invention 23 used in a typical application, the triggering of the discharge of a high energy pulse forming network 27 into a load 26. The charging supply 28 is used to store electrical energy in the capacitors 29 of a pulse forming network (PFN) 27. A spark gap 25 can be added to the secondary circuit 30 as shown if the pulse power load 26 is not an open circuit prior to the application of a high voltage trigger pulse. The spark gap 25 is adjusted to withstand the peak voltage used to initially charge the PFN 27. Once the PFN is fully charged, a high voltage trigger generator driver 24 is used to charge the capacitor/coil stack of the invention until its spark gap 12 breaks down. This breakdown produces a short high voltage pulse at the output 30 of the invention causing the breakdown of the spark gap 25 if one is used, or the breakdown of pulsed power load 26 itself. Once an arc is established, it can be maintained with a much lower voltage than that required to initially cause the breakdown. Subsequently, the electrical energy stored in the PFN 27 will be dumped into the load 26. In this manner, a trigger energy of a few joules or less can initiate the discharge of energy from a PFN storing many kilojoules or even megajoules of electrical energy.

Although the invention has been shown and described in terms of a single preferred embodiment, variations and modifications will be apparent to those skilled in the art. It is, therefore, intended that the invention not be limited to the disclosed embodiment, the true spirit and scope thereof being set forth in the following claims.

I claim:

1. A capacitive-inductive device comprising a capacitor having a stack of at least two conductors, a dielectric material separating adjacent conductors, said stack forming a hollow cylinder with a longitudinal gap, electrical terminals on said capacitor forming opposite sides of said gap, said capacitive-inductive device generating a magnetic field within said hollow cylinder while charging or discharging the capacitor through said terminals, the device having an inductance and a capacitance.

2. The device of claim 1, further comprising a switching device across said electrical terminals for abruptly discharging charges stored on said capacitor for generating a rapidly changing magnetic field proximal said hollow cylinder.

3. The device of claim 2, wherein the switching device is selected from a group consisting of a multiplicity of switching devices, a single switch and a gap switch.

4. The device of claim 1, further comprising a secondary winding of a single cylindrical sheet or a multi-turn helical winding along said hollow cylinder for sharing a magnetic flux generated by discharging said capacitive-inductive device thereby generating an electrical impulse in said secondary winding.

5. The device of claim 1, wherein the conductors further comprise at least two plates, further comprising a power source connected to the terminals for charging the plates, and the plates forming a single turn sheet current by the discharging of the plates.

6. The generator of claim 5, wherein the at least two the conductor plates and dielectric insulation form a cylindrical structure.

7. The generator of claim 5, wherein the terminals are a pair of terminals and wherein each plate is connected to one of the terminals which is opposite to one other of the terminals that is connected to an adjacent plate.

8. The generator of claim 5, further comprising an air gap between the terminals, an arc formed by breaking down of the air gap and discharging the plates, thereby forming a high rate magnetic flux change within a loop of a sheet current boundary.

9. A pulse generator comprising at least two plates, dielectric insulation between the at least two plates, terminals connected to the plates, a power source connected to the terminals for charging the plates and spaced electrodes connected to the plates for discharging the plates, and the plates forming a single turn sheet current by the discharging of the plates, wherein at least two of the plates form a capacitor and at least one of the at least two plates is an inductor.

10. The generator of claim 9, further comprising a resonant circuit formed by an inductance of the inductor and a capacitance of the capacitor.

11. The generator of claim 10, further comprising a damped sinusoidal current waveform formed by a sudden discharge of the inductance and capacitance of the plates.

12. A pulse generator comprising at least two plates, dielectric insulation between the at least two plates, terminals connected to the plates, a power source connected to the terminals for charging the plates and spaced electrodes connected to the plates for discharging the plates, and the plates forming a single turn sheet current by the discharging of the plates, wherein the terminals are disposed along a full length of edges of the cylindrical plates.

13. A pulse generator comprising a dielectric tube, and a capacitor/coil stack of single alternate layers of conductors and dielectric material on the tube and an inductor on an inside of the tube.

14. The generator of claim 13, the inductor further comprising secondary winding on the tube.

15. The generator of claim 14, wherein the winding is, helical.

16. The generator of claim 14, further comprising an insulating barrier between the stack and the secondary winding.

17. The generator of claim 14, further comprising terminals at ends of the winding for electrical connection to a high voltage output.

18. The generator of claim 13, wherein the conductors comprise conducting foil layers.

19. The generator of claim 18, further comprising a clamping device, terminals connected to the stack, wherein the layers are connected to the terminals by sandwiching between the terminals and the terminal clamp.

20. A pulse generator comprising a dielectric tube, and a capacitor/coil stack of alternate layers of conductors and dielectric material on the tube, wherein the conductors comprise conducting foil layers, and wherein the layers are in odd numbers.

21. The generator of claim 20, wherein inner and outer layers are connected to a terminal for maintaining the inner and outer layers at a similar potential.

22. A pulse generator comprising a dielectric tube, and a capacitor/coil stack of alternate layers of conductors and dielectric material on the tube, wherein the conductors comprise conducting foil layers, and wherein the terminals are a rail gap switch.

23. A pulse generator apparatus comprising a primary coil capacitor having spaced sheet conductors coiled in a tube and having ends of the conductors terminating in a gap extending in axial direction along the tube, and first and second terminals mounted at opposite sides of the gap, the spaced sheet conductors alternately connected to the first terminal and connected to the second terminal.

24. The apparatus of claim 23, further comprising a trigger power source connected to the terminals for charging the spaced sheet conductors.

25. The apparatus of claim 24, wherein the terminals further comprise discharge electrodes.

26. The apparatus of claim 25, wherein the terminals and discharge electrodes extending in parallel axial directions.

27. The apparatus of claim 26, wherein the trigger power source charges the spaced sheet conductors up to breakdown voltage between the discharge electrodes for abruptly short circuiting the electrodes and forming an arc across the electrodes, and discharging the plates and forming a primary sheet current loop.

28. The apparatus of claim 23, further comprising a secondary circuit having a multiple turn secondary conductor coil spaced along the primary coil capacitor and arranged in a tubular condition.

29. The apparatus of claim 28, wherein the secondary conductor coil is concentrically positioned with the primary coil conductor.

30. The apparatus of claim 29, wherein the secondary conductor coil comprises multiple helical loops.

31. The apparatus of claim 28, wherein the secondary conductor coil comprises a jelly roll-like rolled sheet conductor having spaced convolutions.

32. The apparatus of claim 28, wherein the secondary circuit further comprises an arc gap switch, a pulsed power load and an energy storing system connected in parallel to the secondary conductor coil.

33. The apparatus of claim 32, wherein the energy storing system comprises a bank of capacitors connected in parallel and plural inductors connected in series with the capacitors, and a charging supply connected to the capacitors and to the inductors for charging the capacitors.

34. The method of pulse generation, comprising providing power from a high voltage generator driver to first and second terminals connected to a primary capacitor coil having stacked and coiled conductive sheets spaced by dielectric material for forming a capacitor, and alternately connected to the first and second terminals, and storing power in the stacked, coiled conductive sheets, shorting the terminals and discharging power from the coiled sheets, thereby creating a sheet current loop.

35. The method of claim 34, further comprising transforming power from the sheet current loop into a secondary coil having a multiple convolution step-up flat conductor coil concentric with the stacked and coiled sheets of the primary capacitor coil, and supplying power from the secondary coil through a power gap for igniting an arc across the power gap, supplying power from a high energy pulse-forming network through the arc to a pulsed power load, and recharging the pulse-forming network with power from a charging supply.

* * * * *